US012811178B2

(12) United States Patent
Wei et al.

(10) Patent No.: US 12,811,178 B2
(45) Date of Patent: Nov. 24, 2026

(54) CYLINDRICAL CELL FLATTENING METHOD AND APPARATUS

(71) Applicant: Guangdong Lyric Robot Automation Co., Ltd., Huizhou (CN)

(72) Inventors: Shiwei Wei, Huizhou (CN); Genwang Yan, Huizhou (CN)

(73) Assignee: Guangdong Lyric Robot Automation Co., Ltd., Huizhou (CN)

( * ) Notice: Subject to any disclaimer, the term of this patent is extended or adjusted under 35 U.S.C. 154(b) by 571 days.

(21) Appl. No.: 18/279,838

(22) PCT Filed: Dec. 19, 2022

(86) PCT No.: PCT/CN2022/140048
§ 371 (c)(1),
(2) Date: Aug. 31, 2023

(87) PCT Pub. No.: WO2023/216593
PCT Pub. Date: Nov. 16, 2023

(65) Prior Publication Data

US 2025/0030038 A1 Jan. 23, 2025

(30) Foreign Application Priority Data

May 9, 2022 (CN) ........................ 202210502988.6

(51) Int. Cl.
*H01M 10/04* (2006.01)
*B21C 51/00* (2006.01)
(Continued)

(52) U.S. Cl.
CPC ......... *H01M 10/0481* (2013.01); *B21C 51/00* (2013.01); *B21D 1/00* (2013.01);
(Continued)

(58) Field of Classification Search
CPC ......... H01M 10/0481; H01M 10/0422; H01M 10/486; H01M 10/0404; H01M 50/533; B21C 51/00; B21D 1/00
See application file for complete search history.

(56) References Cited

U.S. PATENT DOCUMENTS

| | | | |
|---|---|---|---|
| 5,900,030 | A | 5/1999 | Farmer et al. |
| 2021/0083248 | A1 | 3/2021 | Krämer |

FOREIGN PATENT DOCUMENTS

| | | | |
|---|---|---|---|
| CN | 101553950 | A | 10/2009 |
| CN | 103075950 | A | 5/2013 |

(Continued)

OTHER PUBLICATIONS

EPO machine generated English translation of CN 112453109 A (Year: 2021).*

(Continued)

*Primary Examiner* — Kimberly Wyluda
(74) *Attorney, Agent, or Firm* — Daylight Law, P.C.

(57) ABSTRACT

A cylindrical cell flattening method and apparatus are disclosed, which relate to the technical field of cell manufacturing. The cylindrical cell flattening method includes the steps of: loading a battery core onto a base; compressing an outer peripheral surface of the battery core and fixing the battery core; and applying a force to the tabs of the battery core in an axial direction thereof so as to flatten the tabs. The cylindrical cell flattening method and apparatus provided by the present application enables flattening of the tabs of the battery core without colliding with an end surface of the battery core, thus reducing the reject rate during processing.

5 Claims, 5 Drawing Sheets

(51) Int. Cl.

| | |
|---|---|
| ***B21D 1/00*** | (2006.01) |
| ***H01M 10/48*** | (2006.01) |
| ***H01M 50/533*** | (2021.01) |

(52) U.S. Cl.

CPC ... *H01M 10/0404* (2013.01); *H01M 10/0422* (2013.01); *H01M 10/486* (2013.01); *H01M 50/533* (2021.01)

(56) References Cited

FOREIGN PATENT DOCUMENTS

| | | | |
|---|---|---|---|
| CN | 204885326 | U | 12/2015 |
| CN | 108242550 | A | 7/2018 |
| CN | 208368654 | U | 1/2019 |
| CN | 110048071 | A | 7/2019 |
| CN | 210059386 | U | 2/2020 |
| CN | 112117394 | A | 12/2020 |
| CN | 112453109 | A | 3/2021 |
| CN | 114171774 | A | 3/2022 |
| CN | 114388988 | A | 4/2022 |
| CN | 114700393 | A | 7/2022 |
| JP | 2019535999 | A | 12/2019 |
| WO | 2022068449 | A1 | 4/2022 |

OTHER PUBLICATIONS

EPO machine generated English translation of CN 108242550 A (Year: 2018).*

First Office Action dated Jun. 20, 2023 from CN application No. 2022105029886.

Search Report dated Jun. 15, 2023 from CN Application No. 2022105029886.

International Search Report and Written Opinion dated Mar. 15, 2023 from International Application No. PCT/CN2022/140048.

Extended European Search Report from EP Application No. 22926324.9 dated Feb. 5, 2025, 11 pages.

* cited by examiner

CYLINDRICAL CELL FLATTENING METHOD AND APPARATUS

CROSS-REFERENCE TO RELATED APPLICATIONS

This application is a national stage filing under 35 U.S.C. § 371 of international application number PCT/CN2022/140048, filed Dec. 19, 2022, which claims priority to Chinese patent application No. 202210502988.6 filed May 9, 2022. The contents of these applications are incorporated herein by reference in their entirety for all purposes.

TECHNICAL FIELD

The present disclosure relates to the technical field of cell manufacturing, and in particular to a cylindrical cell flattening method and apparatus.

BACKGROUND

A battery core is the most important component of a battery cell, which can be assembled into a battery cell after being processed by mechanical/ultrasonic kneading, encapsulation, casing and collector plate welding in turn. As the performance of the battery core has a direct impact on the performance of the battery cell, the preparation process of the battery core before the assembly of the battery cell is very important. However, kneading equipment in the existing technology typically uses mechanical kneading, with a kneading head having a plurality of kneading rollers, the kneading head realizes rotating and kneading around the tab of a battery core through the kneading rollers. The currently used kneading heads require gripping two ends of a battery core to knead the tab, which can cause damage to the tab during the kneading process and also risk contacting the outer surface of the battery core. Moreover, the current process of kneading the tab of a battery core by using kneading heads is time-consuming, inefficient, and inconsistent in processing quality.

SUMMARY

An objective of the present disclosure is to provide a cylindrical cell flattening method and apparatus, which can improve the processing efficiency and processing quality of battery cores.

The present disclosure is implemented through technical solutions as follows.

According to an embodiment of a first aspect of the present disclosure, there is provided a cylindrical cell flattening method, including the following steps:

S0: loading a battery core onto a base; S1: compressing an outer peripheral surface of the battery core and fixing the battery core; and S2: applying a force to a tab of the battery core in an axial direction thereof so as to flatten the tab.

According to the technical scheme described above, in S0, the battery core is loaded onto the base, which is configured to carry the battery core to move to each station for processing operation. In S1, an outer peripheral surface of the battery core is pressed against the base by a compression force, so as to ensure that the battery core can be fixed on the base and cannot move relative to the base during the whole processing process. In S2, a force is applied to the tab of the battery core in an axial direction thereof to press and flatten the tab. The direction of the acting forces on the tab of the battery core is constant and the forces applied across the tab are equal, so that the tab of the battery core can be stably deformed under compression by the acting forces. The ends of the tab of the battery core gradually approaches the end part of the battery core during the pressing process, and finally deforms into a sheet-like structure with a flat surface and is attached to the end part of the battery core, so that both the flatness and compactness of the end part of the battery core can be guaranteed. In this compression process, the tab of the battery core will not deform in a different direction from that of the acting force, and the tab will deform into a flat disk shape without irregular structures or burrs. The action point of the acting force is always located on the tab of the battery core, and the end surface of the battery core will not be stressed, thus avoiding the influence of the acting force on the end surface of the battery core. In the process of pressing to deform the tab, the force bearing area of the tab will gradually increase with their deformation, and the forces received across the tab are constant. The flatter the tabs become, the larger the force bearing area is, and the faster the deformation speed of the tab will be. It can be concluded that the deformation speed of the tab will become faster with the increase of pressing time. The time required with the gradually increasing flattening speed of the tab is shorter than that required with the constant speed of the existing kneading method. Therefore, the processing time required for flattening the tab is reduced, improving the processing efficiency for the battery cores of the equipment to which the present method is applicable.

According to some embodiments of the present disclosure, in the process of flattening the tab in S2, the battery core is compressed by a plurality of different flattening grooves in sequence.

According to the technical scheme described above, the tab of the battery core needs to be pressed by the plurality of flattening grooves in sequence during the flattening process. The internal shapes of the flattening grooves for pressing the battery core are different from each other, such that the battery core can be deformed step by step accordingly with the flattening grooves with different shapes, thus avoiding the distortion phenomenon of the tab of the battery core in a short time due to excessive deformation speed, and ensuring that the tab of the battery core can be stably pressed into a flat end surface.

According to some embodiments of the present disclosure, before S1, the method further includes a step of S3: acquiring position information of the battery core, and adjusting position of the battery core according to the position information of the battery core to ensure that the battery core is centered on the base.

According to the technical scheme described above, after the battery core is placed on the base, it is required to obtain the position information of the battery core, and push the battery core from either end thereof according to the position information of the battery core, so that the battery core can be centered on the base. By detecting and adjusting the position of the battery core, and then re-detecting the position of the battery core, it is ensured that the battery core can be held in a preset position when carried by the base and staying on each station for processing operation, so that the operation of each process gone through by the battery core can be accurate and effective.

According to some embodiments of the present application, after S2, the method further includes a step of S4: electrically connecting a cathode and an anode of the battery core to acquire temperature change information at two ends of the battery core when the cathode and the anode of the battery core are being connected, and determining whether the battery core is short-circuited according to the temperature change information at two ends of the battery core.

According to the technical scheme described above, a cathode and an anode of the battery core are electrically connected, and the current passing through the battery core will cause the temperature change of the battery core. The temperature change information at two ends of the battery core is acquired when the cathode and the anode of the battery core are being connected, so as to determine whether the battery core is short-circuited according to the temperature change information at two ends of the battery core. The battery core through which the current can pass properly can enter the subsequent processing flow and be processed into a battery cell, whereas the battery core with excessive temperature change, abnormal current circulation or a short circuit will be picked out for inspection or rework. This method can quickly sift out defective products in processing, avoid defective products in commodities and maintain a positive consumer experience.

According to some embodiments of the present disclosure, after S2, the method further includes a step of S5: measuring a dimension of the battery core in the axial direction thereof after the tab has been flattened.

According to the technical scheme described above, the entire axial length of the battery core after the tab has been flattened is measured, and it is determined whether the battery core is pressed to a proper length in the flattening process according to the length data of the battery core. The battery core with a length that does not conform to the preset value can be quickly screened out, and then the rejected battery core is subjected to scrapping treatment or reworking according to the actual situation. The method can quickly sift out unqualified products in the processing flow and reduce the reject rate of commodities.

According to some embodiments of the present disclosure, after S2, the method further includes a step of S6: measuring a flatness of a flattened surface of the tab of the battery core.

According to the technical scheme described above, flatness measurement is performed on the flattened surface of the tab of the battery core, and based on the measured values, it is determined whether the battery core reaches a standard for entering a subsequent manufacturing process. Any battery core that does not meet the standard is removed promptly, ensuring a high yield of quality products.

According to an embodiment of a second aspect of the present disclosure, there is provided a cylindrical cell flattening apparatus, including a base, a fixing device and a flattening device. The base is configured to support a battery core. The fixing device includes a driving mechanism and a fixing piece. The fixing piece is mounted at an output end of the driving mechanism, and the driving mechanism is configured to drive the fixing piece to move toward the base to fix the battery core onto the base. The flattening device includes a pair of flattening mechanisms respectively arranged on two sides of the base. Each flattening mechanism includes a first driving member and a flattening seat. The flattening seat is mounted on the first driving member, and the first driving member is configured to drive the flattening seat to press a tab of the battery core in order to form a flattened battery core.

According to the technical scheme described above, the fixing piece is mounted at the output end of the driving mechanism, and the driving mechanism drives the fixing piece to move toward the battery core relative to the base and presses and fixes the battery core on the base, thus ensuring that the battery core remains stationary relative to the base during the manufacturing process, despite any forces that can be applied. On each side of the base, there is a flattening mechanism provided to flatten both ends of the battery core simultaneously. The flattening seat is mounted on the first driving member, and the first driving member is configured to drive the flattening seat to press the tab of the battery core. The flattening device changes the tab of the battery core into a flat sheet structure by means of pressing, and the direction of the acting force from the flattening seat is constant. At the same time, the acting force received by the tab in the deformation process will continuously push the tab to the end surface of the battery core, and the compressed surface of the tab can be flattened by continuous compression, thus ensuring the flatness and compactness of the end of the battery core. In the pressing process, the tab of the battery core and the flattening seat make contact with each other continuously without collision, thus preventing the damage of the tab due to impact and improving the processing stability. In addition, the flattening seat makes contact with the tab once the flattening operation starts, and when the tab gradually becomes flat, the flattening seat will gradually approach the battery core and finally contact the end surface of the battery core. In the whole flattening operation process, the flattening seat will not make contact with the outer peripheral surface of the cylindrical battery core, thus reducing the risk of damage to the outer peripheral surface of the battery core and effectively improving the production stability.

According to some embodiments of the present disclosure, the flattening seat of each flattening mechanism is provided with a plurality of flattening grooves corresponding to the tab of the battery core, and internal walls of the plurality of flattening grooves are different from each other.

According to the technical scheme described above, the flattening seat of each flattening mechanism is provided with a plurality of flattening grooves corresponding to the tab of the battery core, and the plurality of flattening grooves are shaped differently from each other. According to the order in which the battery core is compressed by the flattening grooves, the first flattening recess is a hemispherical recess structure, the last flattening recess is a regular circular blind hole structure, and the structures of other flattening grooves sequentially and gradually change from the structure of the first flattening recess to the structure of the last flattening recess. The tab can be gradually deformed by flattening the tab with a plurality of flattening grooves, thus avoiding the continuous flattening of the tab by a single flattening recess. The greater the deformation degree of the tab, the greater the reaction force fed back to the flattening recess, and the flattening recess will be more easily damaged if it is continuously stressed for a long time. Breaking down the deformation process of the tab into multiple stages by using multiple flattening grooves in a relay fashion can disperse the pressure compared to using a single flattening recess, thus ensuring the flattening effect and prolonging the service life of the flattening device. In addition, performing the flattening process in stages can also introduce intervals of time during which the battery core is under stress. This can help to prevent the battery core from being deformed or damaged due to prolonged and continuous stress, thereby ensuring that the processing apparatus for manufacturing cylindrical cells, as described in the present disclosure, can reliably process the battery cores and reduce the reject rate of the apparatus.

According to some embodiments of the present disclosure, the cylindrical cell flattening apparatus further includes a first detection device, where the first detection device includes a pair of first detection mechanisms respectively arranged on two sides of the base; and one of the first detection mechanisms includes a second driving member, a first pressing piece and a distance measuring sensor, the first pressing piece is mounted on the second driving member, the second driving member is configured to drive the first pressing piece to push the battery core on the base to move, the distance measuring sensor is mounted on the first pressing piece, and the distance measuring sensor is configured to detect a position of the battery core on the base.

According to the technical scheme described above, the first pressing piece is mounted on the second driving member, and the second driving member is configured to drive the first pressing piece to push the battery core on the base to move. The distance measuring sensor is arranged on the first pressing piece and is configured to detect the position of the battery core on the base. The distance measuring sensor arranged on the first pressing piece can measure the distance from itself to the base and the distance from itself to the end surface of the battery core, and the position of the battery core on the base can be determined from the difference between the two distances. Then, the first pressing piece can be driven into contact with the end of the battery core by the second driving member according to the position information of the battery core on the base, and push the battery core to make it centered on the base. The battery core is set at a preset position, which can eliminate the need for the actuator at each station to perform an alignment step when processing the battery core, so that the battery core can be directly processed at each station, thus accelerating the processing rate of the battery core. In addition, the centered arrangement of the battery core can also prevent the situation where two ends of the battery core are subjected to forces of different magnitudes during processing, which can lead to the damage of one end of the battery core that is subjected to a greater force, and improves the yield rate of the apparatus.

According to some embodiments of the present disclosure, the cylindrical cell flattening apparatus further includes a third detection device, where the third detection device includes a pair of third detection mechanisms respectively arranged on two sides of the battery core on the base. One of the third detection mechanisms includes a third driving member, a second pressing piece, and a contact sensor, the second pressing piece is mounted on the third driving member, the third driving member is configured to drive the second pressing piece into contact with an end of the battery core, the contact sensor is mounted on the second pressing piece, and the contact sensor is configured to measure a length of the flattened battery core.

According to the technical scheme described above, a pair of third detection mechanisms are respectively arranged at two sides of the battery core on the base, which is convenient for the third detection mechanisms to operate at two ends of the battery core at the same time. The second pressing piece is mounted on the third driving member. The third driving member is configured to drive the second pressing piece into contact with the end of the battery core. The contact sensor is mounted on the second pressing piece, and the contact sensor is configured to measure the length of the flattened battery core. The second pressing piece is moved to a predetermined position of the end part of the battery core under the drive of the third driving member. The reaction force that the second pressing piece receives when it comes into contact with the end surface of the battery core will be detected by the contact sensor. The actual length of the battery core is determined by the measured value, and then it is determined whether the battery core is qualified. Any defective battery cores can be removed promptly to avoid the waste of processing resources.

According to some embodiments of the present disclosure, the cylindrical cell flattening apparatus further includes a fourth detection device, where the fourth detection device includes a pair of fourth detection mechanisms respectively arranged on two sides of the battery core on the base, and one of the fourth detection mechanisms includes a fourth driving member, a positioning plate and a displacement sensor, the positioning plate is mounted on the fourth driving member, the fourth driving member is configured to drive the positioning plate into contact with the tab of the battery core, and the displacement sensor is configured to measure a flatness of an end surface of the flattened battery core.

According to the technical scheme described above, a pair of fourth detection mechanisms are respectively arranged at two sides of the battery core on the base, which is convenient for detection on two ends of the battery core at the same time. The positioning plate is mounted on the fourth driving member. The fourth driving member is configured to drive the positioning plate into contact with the tab of the battery core. The displacement sensor is configured to measure a flatness of an end surface of the flattened battery core. After the positioning plate comes into contact with two ends of the battery core, the fourth driving member drives the displacement sensor to rotate and to measure the flatness of the two ends of the battery core, so as to sift out any unqualified battery cores in a timely manner, thus ensuring a high yield rate of the battery cores processed by the cylindrical cell flattening apparatus provided by the present disclosure.

According to some embodiments of the present disclosure, the positioning plate is provided with a plurality of inner holes and a plurality of outer holes, the inner holes and the outer holes are circumferentially arrayed on the positioning plate, and a diameter of a circle formed by the plurality of inner holes is smaller than a diameter of a circle formed by the plurality of outer holes; the plurality of outer holes are arranged such that axial projections of the plurality of outer holes onto the end surface of the flattened battery core do not overlap a tab surface of the flattened battery core, the displacement sensor is movably arranged on the fourth driving member, and the displacement sensor emits laser light passing through the plurality of outer holes for measuring a flatness of an outer annular area of the tab of the flattened battery core; and the plurality of inner holes are arranged such that axial projections of the plurality of inner holes onto the end surface of the flattened battery core are within the tab surface of the flattened battery core, and the displacement sensor emits laser light passing through the plurality of inner holes for measuring a flatness of an inner annular area of an end surface of the tab of the flattened battery core.

According to the technical scheme described above, after the positioning plate clamps either end of the battery core, the displacement sensor rotates under the drive of the fourth driving member to drive the displacement sensor to rotate. The laser from the displacement sensor passes through each outer hole in turn along with the rotation, and the distance between the displacement sensor itself and the tab end surface corresponding to each outer hole is measured. The flatness of the outer annular area of the tab end surface of the battery core is obtained by comparing the distance data measured through the outer holes to each other. The displacement sensor moves along with the fourth driving member, such that its laser can pass through the inner holes of the positioning plate. The laser from the displacement sensor passes through each inner hole in turn, and the distance between the displacement sensor itself and the tab end surface corresponding to each inner hole is measured. The flatness of the inner annular area of the tab end surface of the battery core is obtained by comparing the distance data measured through the inner holes to each other. Finally, the obtained flatness of the inner and outer annular areas are compared again to obtain accurate flatness data about the tab end surface of the battery core, so as to determine whether the battery core is a qualified product.

Other features and advantages of the present disclosure will be described in detail in the detailed description section that follows.

BRIEF DESCRIPTION OF DRA WINGS

In order to more clearly describe the technical schemes of embodiments of the present disclosure, the accompanying drawings required in the embodiments will be described briefly below. It should be understood that the following accompanying drawings illustrate only some embodiments of the present disclosure and therefore should not be construed as a limitation on the scope thereof. For those of ordinary skill in the art, other relevant accompanying drawings can also be obtained from these accompanying drawings without any creative effort.

Figure 1:
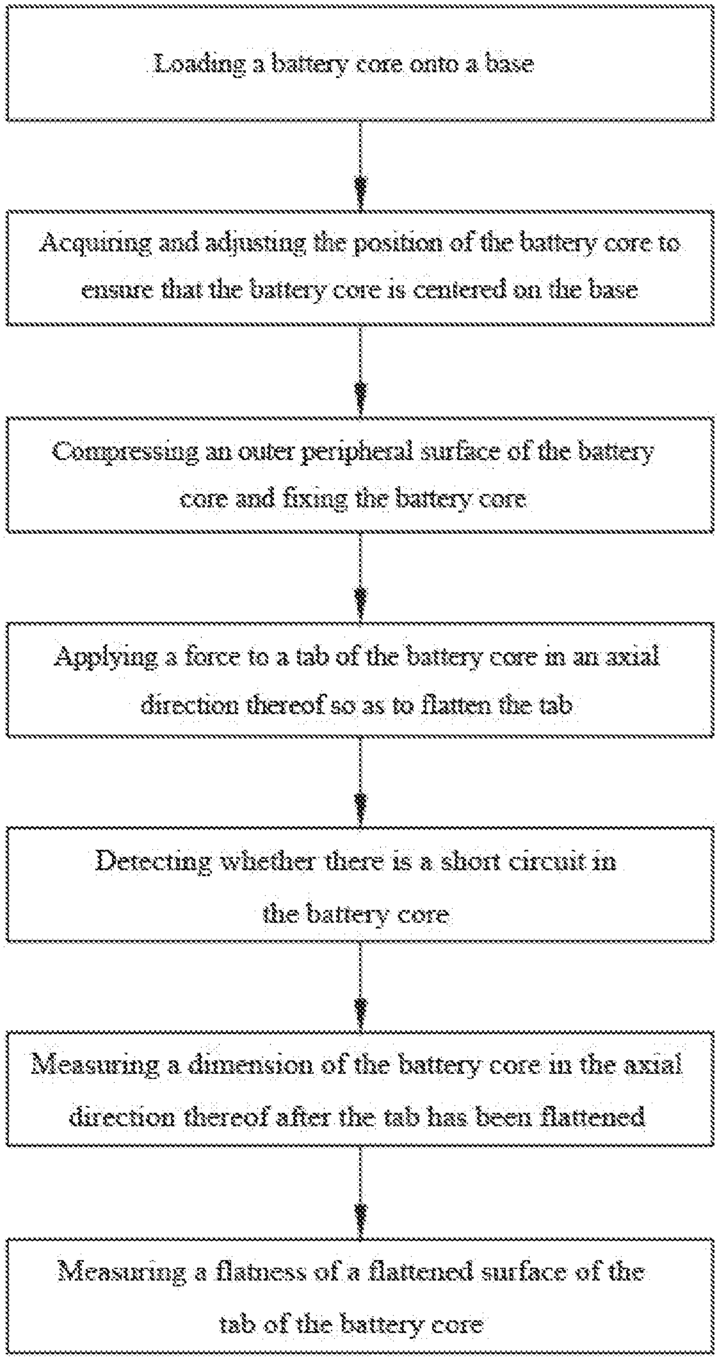
FIG. 1 is a schematic flowchart of a cylindrical cell flattening method according to some embodiments of the present disclosure.

Reference numerals: 100—Battery core; 110—Base; 200—First detection device; 201—Second driving member; 202—First pressing piece; 203—Clearance groove; 301—Driving mechanism; 302—Fixing piece; 401—First driving member; 402—Flattening seat; 403—Flattening groove; 501—Fifth driving member; 502—Electrical connector; 601—Third driving member; 602—Second pressing piece; 603—Contact sensor; 701—Fourth driving member; 702—Displacement sensor; 710—Positioning plate; 711—Inner hole; 712—Outer hole; 120—Conveying mechanism; 300—Fixing device; and 400—Flattening device.

DETAILED DESCRIPTION

In order to make the objectives, technical solutions and advantages of embodiments of the present disclosure clearer, the technical schemes in the embodiments of the present disclosure will be described clearly and completely below with reference to the accompanying drawings in the embodiments of the present disclosure. Apparently, the embodiments described are only some of, rather than all of, the embodiments of the present disclosure. Generally, the components of embodiments of the present disclosure described and illustrated in the drawings herein can be arranged and designed in a variety of different configurations.

In the description of the embodiments of the present disclosure, it should be noted that orientation or positional relationships indicated by terms such as "inner" and "outer" are based on the orientation or positional relationships shown in the accompanying drawings, or the orientation or positional relationships by which the product of the present disclosure is usually placed in use, and are to facilitate the description of the present disclosure and simplify the description only, rather than indicating or implying that the device or element referred to must have a specific orientation or be constructed and operated in a specific orientation, and therefore cannot be construed as limiting the present disclosure. In addition, the terms such as "first" and "second" are for the purpose of distinguishing description only and should not be construed as indicating or implying relative importance.

In the description of the present disclosure, it should also be noted that the terms such as "arrange" and "connect" should be interpreted in a broad sense unless explicitly defined and limited otherwise. For example, the connection can be a fixed connection, a detachable connection, or an integral connection, or can be a direct connection, an indirect connection by means of an intermediate medium, or internal communication between two elements. For those of ordinary skill in the art, the specific meanings of the foregoing terms in the present disclosure can be construed according to specific circumstances.

An embodiment of a first aspect of the present disclosure provides a cylindrical cell flattening method, which can relieve a series of problems in the existing kneading method that: the direction of the force is constantly changed when the force is applied to the tab of a battery core 100 in the kneading method, so that the deformation process of the tab of the battery core 100 is irregular, and the flatness and compactness of the end of the flattened battery core 100 are poor; the collision between the tab of the battery core 100 and the kneading head leads to burrs on the tab; the kneading head collides with the shell of the battery core 100 during the kneading process, causing the battery core 100 to be deformed or even defective; the required time for kneading is long, etc. By pressing the tab of the battery core 100 multiple times with pressing heads with different radians, the tab can be flattened without causing any damage to the tab. The flattening device using the method of the present disclosure is compatible with both full-tab battery cores 100 and multi-tab battery cores 100. A cylindrical cell flattening method according to an embodiment of the first aspect of the present disclosure is described below with reference to the accompanying drawings.

As shown in FIG. 1, the cylindrical cell flattening method of the present disclosure is suitable for processing a cylindrical-shaped battery core 100. The tabs of the battery core 100 extend from two ends of the battery core 100, and the tabs of the battery core 100 need to be flattened and attached to the end surfaces of the battery core 100 by flattening before subsequent assembly procedures can be performed. The cylindrical cell flattening method includes the following steps.

At S0, a battery core 100 is loaded onto a base 110. The processing of the battery core 100 is carried out by transporting the battery core 100 to different stations through the base 110. An axial direction of the battery core 100 loaded onto the base 110 is perpendicular to the moving direction of the base 110, and the tabs at two ends of the battery core 100 are exposed to facilitate processing.

At S1, an outer peripheral surface of the battery core 100 is compressed such that the battery core 100 is pressed and fixed against the base 110. When the battery core 100 is being processed, the two ends of the battery core 100 may not be stressed simultaneously, and the time difference can cause the battery core 100 to move along the axial direction. The battery core 100 is pressed and fixed on the base 110 to keep the battery core 100 from moving during the processing of the battery core 100 or during movement of the base 110, thus ensuring that the battery core 100 can be processed properly.

At S2, a force is applied to tabs of the battery core 100 in an axial direction thereof to press and flatten the tabs. The existing kneading device typically uses kneading rollers to rotate and flatten the tabs around the tabs of the battery core 100, and the direction of the force received by the tabs in the flattening process is constantly changing, and the changing process is quite irregular. Compared with the existing technology, when the processing apparatus according to the present method is used to process the tabs of the battery core 100, the two ends of the battery core 100 with tabs are simultaneously subjected to forces along its axial direction. The directions of the forces on the two ends of the battery core 100 are opposite, which allows the battery core 100 to maintain a state of force balance. The tabs of the battery core 100 are pressed into a round cake shape by the force in a single direction, and the deformation process of the tabs is relatively regular. After the pressing process is completed, the tabs can be tightly attached to the end of the battery core 100. Additionally, during the deformation process, the forces acting on the tabs are uniform and evenly distributed throughout the process. The end surface with flattened tabs is flat and smooth, and the method can effectively improve the processing quality of the tabs of the battery core 100, improve the processing stability, reduce the scrap rate of the battery core 100, and reduce the probability that the battery core 100 needs rework.

Further, between S0 and S1, there is an additional step of S3, in which the position of the battery core 100 on the base 110 is obtained by measurement, and then the battery core 100 is pushed from either end of the battery core 100 according to the measured position information of the battery core 100, so as to ensure that the battery core 100 is centered on the base 110. The centered battery core 100 makes the two ends of the battery core 100 receive equal forces when being processed, so that the battery core 100 can maintain a state of force balance during the operation process, and the processing effects received by two ends of the battery core 100 are the same, thus improving the stability of the finished product of the battery core 100.

Further, S2 is followed by a step of S4, in which a cathode and an anode of the battery core 100 are electrically connected, so that the current passing through the battery core 100 will cause the temperature change of the battery core 100, and the temperature change information at two ends of the battery core 100 is acquired when the cathode and the anode of the battery core 100 are being connected, so as to determine whether the battery core 100 is short-circuited according to the temperature change information at two ends of the battery core 100. The battery core 100 through which the current can pass properly can enter the subsequent processing flow and be processed into a battery cell, whereas the battery core 100 with excessive temperature change, abnormal current circulation or a short circuit will be picked out for inspection or rework. This method can quickly sift out defective products in processing, avoid defective products in commodities and maintain a positive consumer experience.

Further, S2 is followed by a step of S5, in which the entire axial length of the battery core 100 is measured after the tabs have been flattened, and it is determined whether the battery core 100 is pressed to a proper length in the flattening process according to the length data of the battery core 100. The battery core with a length that does not conform to the preset value can be quickly screened out, and then the rejected battery core is subjected to scrapping treatment or reworking according to the actual situation. The method can quickly sift out unqualified products in the processing flow and reduce the reject rate of commodities.

Further, S2 is followed by a step of S6, in which flatness measurement is performed on the flattened surface of the tabs of the battery core 100, and based on the measured values, it is determined whether the battery core 100 reaches a standard for entering a subsequent manufacturing process. Any battery core 100 that does not meet the standard is removed in a timely manner, ensuring a high yield of quality products.

Figure 2:
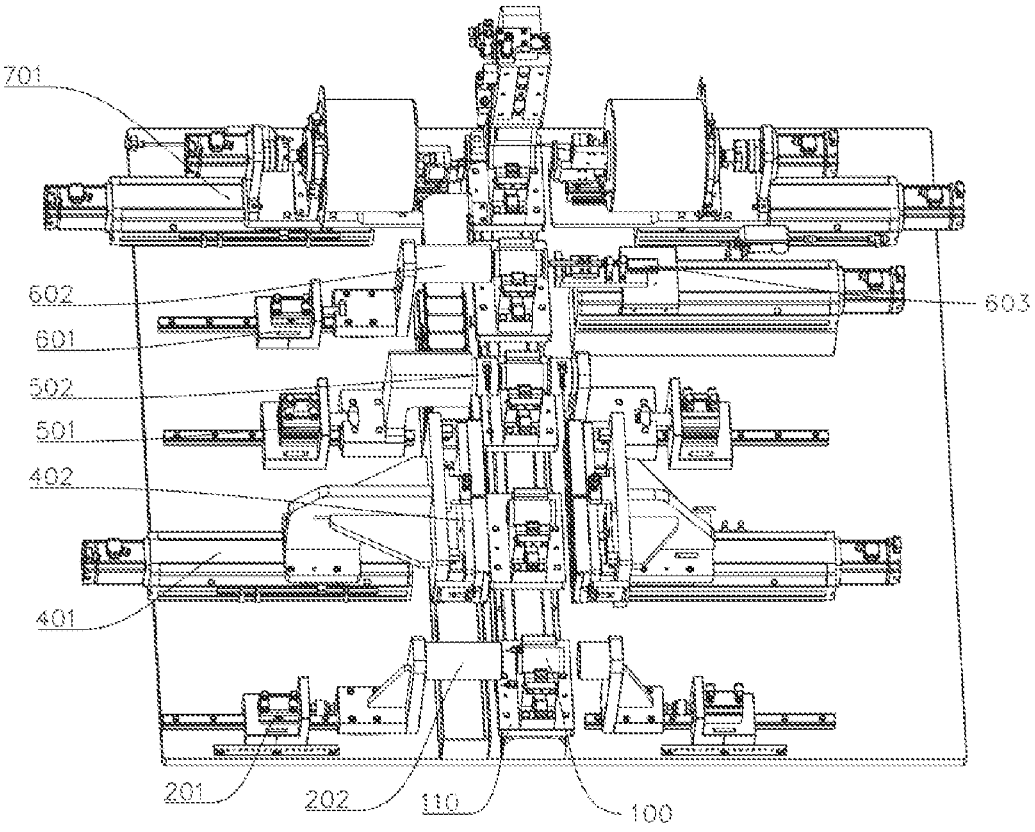
FIG. 2 is a schematic diagram of a cylindrical cell flattening apparatus according to some embodiments of the present disclosure.

As shown in FIG. 2, in a second aspect, the present disclosure also provides a cylindrical cell flattening apparatus, including a conveying mechanism 120, a base 110, a first detection device 200, a fixing device 300, a flattening device 400, a second detection device, a third detection device and a fourth detection device. The base 110 is arranged on the conveying mechanism 120, the fixing device 300 is arranged on the base 110, and the base 110 is configured to carry the battery core 100. The conveying mechanism 120 drives the base 110 to pass through the processing stations of the first detection device 200, the flattening device 400, the second detection device, the third detection device and the fourth detection device in turn. Firstly, the position of the battery core 100 is adjusted by the first detection device 200, such that the battery core 100 is centered on the base 110. Secondly, the fixing device 300 fixes the battery core 100 in position on the base 110, and the fixing effect of the fixing device 300 on the battery core 100 will continue until unloading. Thirdly, the flattening device 400 flattens the tabs at two ends of the battery core 100. Then, the second detection device performs short circuit detection on the battery core 100. Next, the third detection device measures the length of the battery core 100. Finally, the fourth detection device measures the flatness of the tab end surfaces at two ends of the battery core 100. Once the second detection device, the third detection device or the fourth detection device finds out that a battery core 100 is an unqualified product according to its detection result, the unqualified battery core 100 will not be passed to the next processing step, but will be unloaded directly to avoid waste of processing resources.

Figure 5:
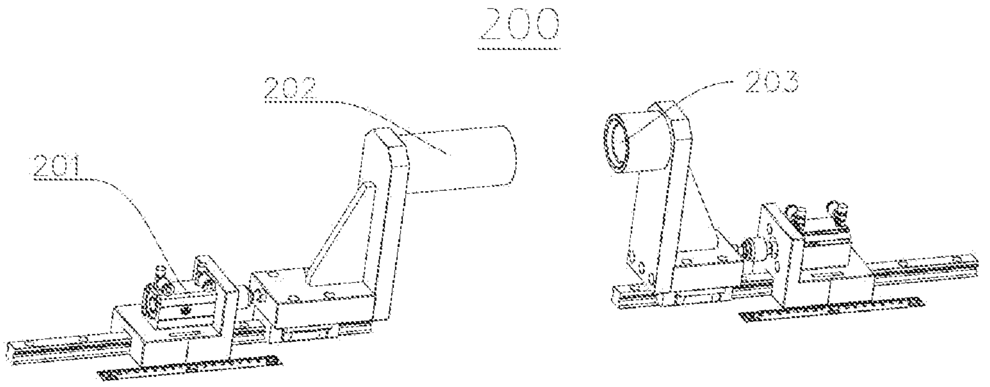
FIG. 5 is a schematic diagram of a first detection device according to some embodiments of the present disclosure.

In an embodiment of the second aspect of the present disclosure, as shown in FIG. 5, the first detection device 200 includes a pair of first detection mechanisms respectively provided on two sides of the base 110. One of the first detection mechanisms includes a second driving member 201, a first pressing piece 202 and a distance measuring sensor. The first pressing piece 202 is mounted on the second driving member 201. The second driving member 201 is configured to drive the first pressing piece 202 to push the battery core 100 on the base 110 to move. The distance measuring sensor is mounted on the first pressing piece 202, and the distance measuring sensor is configured to detect the position of the battery core 100 on the base 110. The distance measuring sensor arranged on the first pressing piece 202 can measure the distance from itself to the base 110 and the distance from itself to the end surface of the battery core 100, and the position of the battery core 100 on the base 110 can be determined from the difference between the two distances. Then, the first pressing piece 202 can be driven into contact with the end of the battery core 100 by the second driving member 201 according to the position information of the battery core 100 on the base 110, and push the battery core 100 to make it centered on the base 110. The battery core 100 is set at a preset position, which can eliminate the need for the actuator at each station to perform an alignment step when processing the battery core 100, so that the battery core 100 can be directly processed at each station, thus accelerating the processing rate of the battery core 100. In addition, the centered arrangement of the battery core 100 can also prevent the situation where two ends of the battery core 100 are subjected to forces of different magnitudes during processing, which can lead to the damage of one end of the battery core 100 that is subjected to a greater force, and improves the yield rate of the apparatus.

Figure 3:
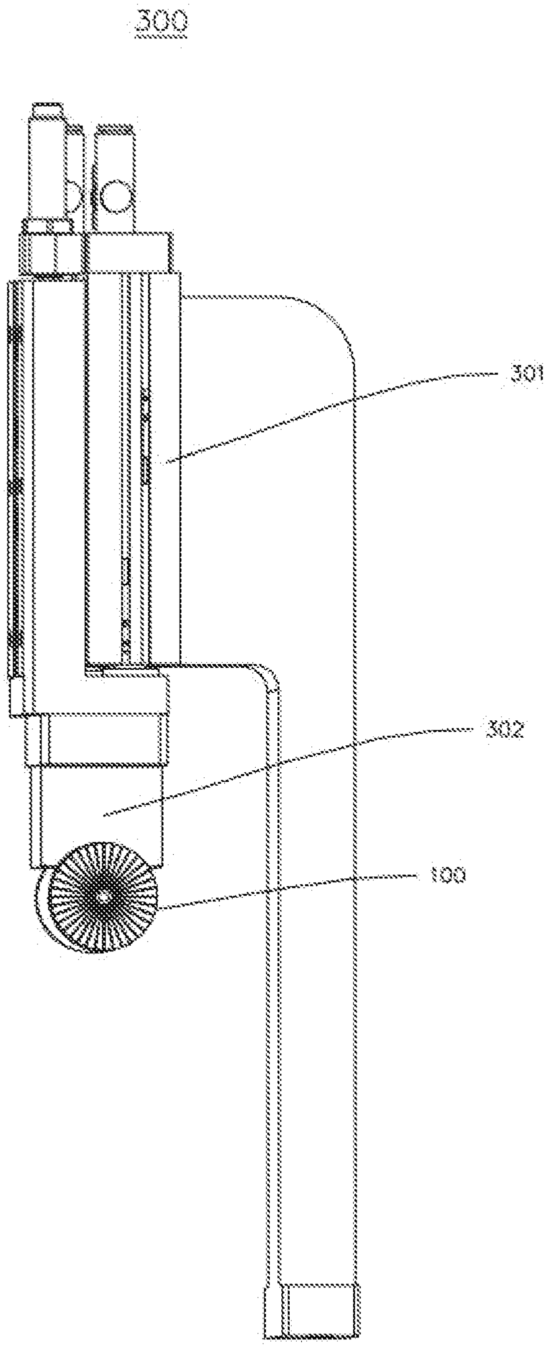
FIG. 3 is a schematic diagram of a fixing device according to some embodiments of the present disclosure.

In an embodiment of the second aspect of the present disclosure, as shown in FIG. 3, the fixing device 300 includes a driving mechanism 301 and a fixing piece 302. The fixing piece 302 is mounted at an output end of the driving mechanism 301. The driving mechanism 301 is configured to drive the fixing piece 302 to move toward the base 110 to fix the battery core 100 onto the base 110, so as to ensure that the battery core 100 will not move relative to the base 110 due to any forces that can be applied during the manufacturing process.

Figure 4:
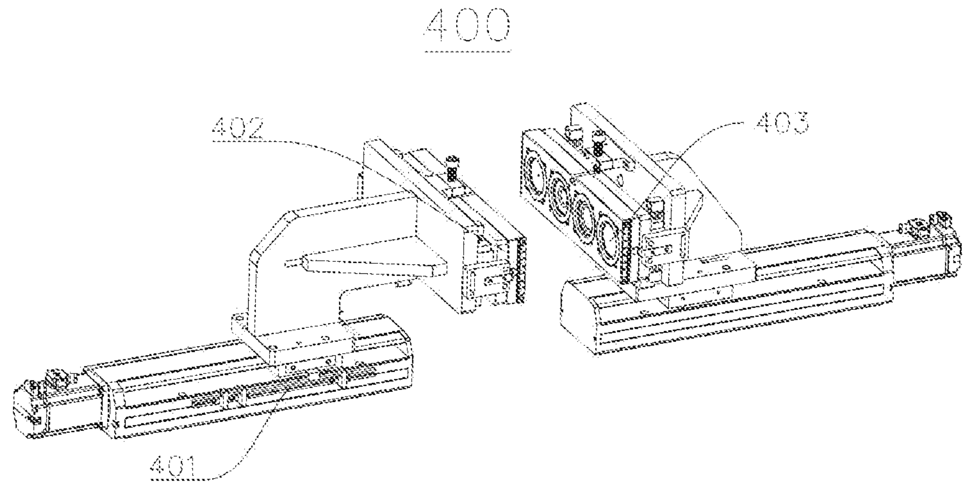
FIG. 4 is a schematic diagram of a flattening device according to some embodiments of the present disclosure.

In an embodiment of the second aspect of the present disclosure, as shown in FIG. 4, the flattening device 400 includes a pair of flattening mechanisms respectively provided on two sides of the base 110. Each flattening mechanism includes a first driving member 401 and a flattening seat 402. The flattening seat 402 of each flattening mechanism is mounted on the first driving member 401. The first driving member 401 is configured to drive the flattening seat 402 to press the tabs of the battery core 100. The flattening seat 402 is provided with a plurality of flattening grooves 403 corresponding to the tabs of the battery core 100. The internal walls of the flattening grooves 403 are different from each other. According to the order in which the battery core 100 is compressed by the flattening grooves 403, the first flattening recess 403 is a hemispherical recess structure. The remaining flattening grooves 403 are all composed of a groove wall and a groove bottom, where the groove bottom is a surface opposite the opening of the flattening groove 403, and the groove wall is an annular surface connected between the groove opening and the groove bottom. The last flattening groove 403 is a regular circular blind hole structure, and the structure of other flattening grooves 403 has a circular cambered bottom and an annular structure with radians. The structure of other flattening grooves 403 gradually changes from the structure of the first flattening groove 403 to the structure of the last flattening groove 403 in sequence, that is, the flattening groove 403 closer to the first flattening groove 403 is closer to a hemispherical structure, and the flattening groove 403 closer to the last flattening groove 403 is closer to a circular blind hole structure. The tabs can be gradually deformed by flattening the tabs with the plurality of flattening grooves 403, thus avoiding the continuous flattening of the tab by a single flattening groove 403. The greater the deformation degree of the tabs, the greater the reaction force fed back to the flattening groove 403, and the flattening groove 403 will be more easily damaged if it is continuously stressed for a long time. Breaking down the deformation process of the tabs into multiple stages by using multiple flattening grooves 403 in a relay fashion can disperse the pressure compared to using a single flattening groove 403, thus ensuring the flattening effect and prolonging the service life of the flattening device. In addition, performing the flattening process in stages can also introduce intervals of time during which the battery core 100 is under stress. This can help to prevent the battery core 100 from being deformed or damaged due to prolonged and continuous stress, thereby ensuring that the processing apparatus for manufacturing cylindrical cells, as described in the present disclosure, can reliably process the battery cores and reduce the reject rate of the apparatus.

In an embodiment of the second aspect of the present disclosure, the cylindrical cell flattening apparatus further includes the second detection device for short circuit detection for the flattened battery core 100. The second detection device includes a pair of second detection mechanisms respectively arranged on two sides of the base 110 on which the battery core 100 is loaded. One of the second detection mechanisms includes a fifth driving member 501, an electrical connector 502 and a temperature sensor. The electrical connector 502 is arranged at an output end of the fifth driving member 501. The fifth driving member 501 is configured to drive the electrical connector 502 to be electrically connected to the tab ends of two ends of the battery core 100. The temperature sensor is mounted on the electrical connector 502 and configured to measure the temperature of both ends of the battery core 100. It is determined whether the battery core 100 is short-circuited by measuring the temperature change of both ends of the battery core 100 after the electric current is activated. The detecting device can quickly screen out the unqualified products in the processed battery core 100, preventing the unqualified products from entering the subsequent processing flow, and saving processing resources.

Figure 6:
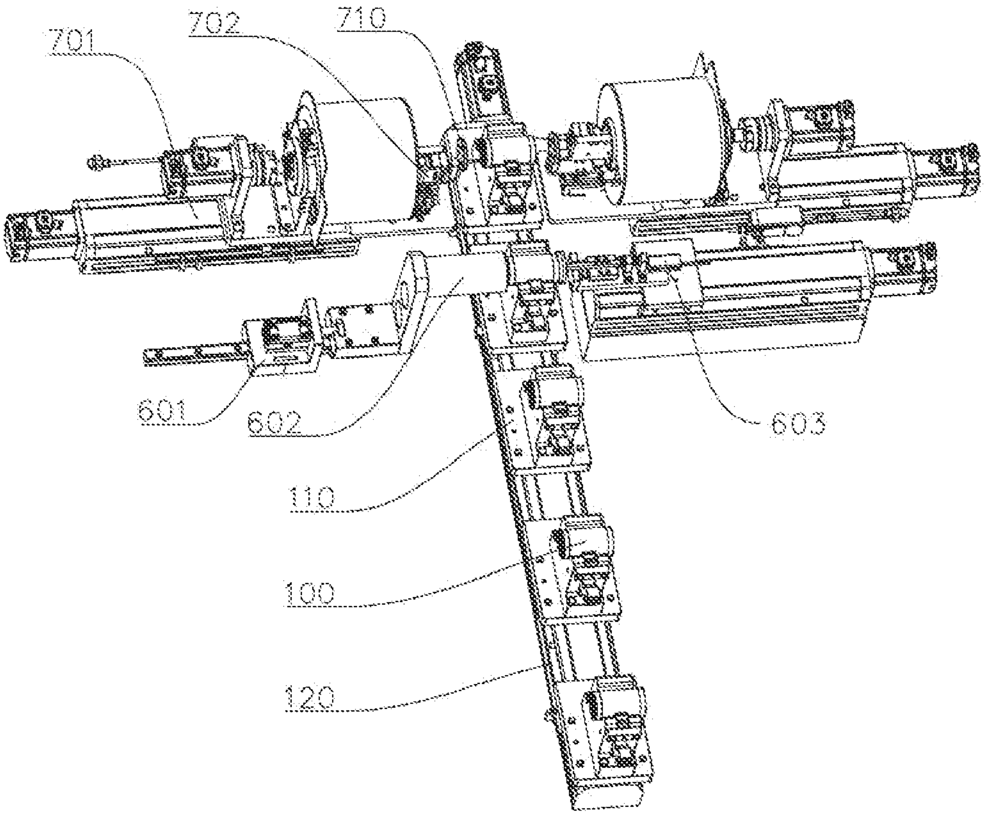
FIG. 6 is a schematic diagram of a third detection device and a fourth detection device according to a first embodiment of the present disclosure.

In an embodiment of the second aspect of the present disclosure, as shown in FIG. 6, the cylindrical cell flattening apparatus further includes the third detection device. The third detection device includes a pair of third detection mechanisms respectively arranged on two sides of the battery core 100 on the base 110. One of the third detection mechanisms includes a third driving member 601, a second pressing piece 602, and a contact sensor 603. The second pressing piece 602 is mounted on the third driving member 601. The third driving member 601 is configured to drive the second pressing piece 602 into contact with an end of the battery core 100. The contact sensor 603 is mounted on the second pressing piece 602, and the contact sensor 603 is configured to measure a length of the flattened battery core 100. The second pressing piece 602 is moved to a predetermined position of the end part of the battery core 100 under the drive of the third driving member 601. The reaction force that the second pressing piece 602 receives when it comes into contact with the end surface of the battery core 100 will be detected by the contact sensor 603. The actual length of the battery core 100 is determined by the measured value, and then it is determined whether the battery core 100 is qualified. Any defective battery cores can be removed in a timely manner to avoid the waste of processing resources.

In an embodiment of the second aspect of the present disclosure, the cylindrical cell flattening apparatus further includes a fourth detection device. The fourth detection device includes a pair of fourth detection mechanisms respectively arranged on two sides of the battery core 100 on the base 110. One of the fourth detection mechanisms includes a fourth driving member 701, a positioning plate 710 and a displacement sensor 702. The positioning plate 710 is mounted on the fourth driving member 701. The fourth driving member 701 is configured to drive the positioning plate 710 into contact with the tabs of the battery core 100. The displacement sensor 702 is configured to measure a flatness of an end surface of the flattened battery core 100. After the positioning plate 710 comes into contact with two ends of the battery core 100, the fourth driving member 701 drives the displacement sensor 702 to rotate to measure the flatness of the two ends of the battery core 100, so as to sift out any unqualified battery cores 100 in a timely manner, thus ensuring a high yield rate of the battery cores 100 processed by the cylindrical cell flattening apparatus provided by the present disclosure.

Figure 7:
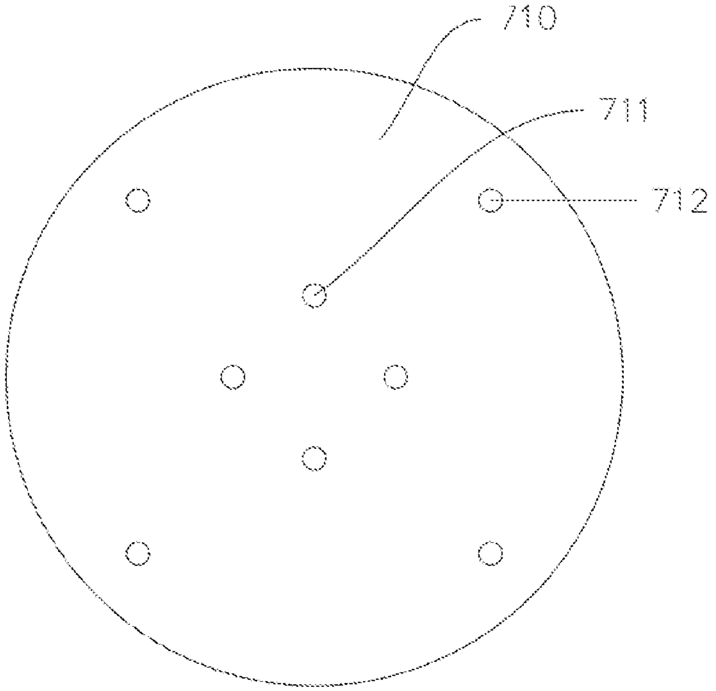
FIG. 7 is a schematic diagram of a positioning plate according to the first embodiment of the present disclosure.

Further, as shown in FIG. 7, the positioning plate 710 is provided with a plurality of inner holes 711 and a plurality of outer holes 712. The inner holes 711 and the outer holes 712 are circumferentially arrayed on the positioning plate 710, and a diameter of a circle formed by the plurality of inner holes 711 is smaller than a diameter of a circle formed by the plurality of outer holes 712. The plurality of outer holes 712 are arranged such that axial projections of the plurality of outer holes onto the end surface of the flattened battery core 100 do not overlap a tab surface of the battery core 100. The displacement sensor 702 is movably arranged on the fourth driving member 701, and the displacement sensor 702 emits laser light passing through the plurality of outer holes 712 for measuring a flatness of an outer annular area of the tabs of the battery core 100. The plurality of inner holes 711 are arranged such that axial projections of the plurality of inner holes onto the end surface of the flattened battery core are within the tab surface of the battery core 100. The displacement sensor 702 emits laser light passing through the plurality of inner holes 711 for measuring a flatness of an inner annular area of an end surface of the tabs of the flattened battery core 100. After the positioning plate 710 clamps either end of the battery core 100, the displacement sensor 702 rotates under the drive of the fourth driving member 701 to drive the displacement sensor 702 to rotate. The laser from the displacement sensor 702 passes through each outer hole 712 in turn along with the rotation, and the distance between the displacement sensor itself and the tab end surface corresponding to each outer hole 712 is measured. The flatness of the outer annular area of the tab end surface of the battery core 100 is obtained by comparing the distance data measured through the outer holes 712 to each other. The displacement sensor 702 moves along with the fourth driving member 701, such that its laser can pass through the inner holes 711 of the positioning plate 710. The laser from the displacement sensor 702 passes through each inner hole 711 in turn, and the distance between the displacement sensor itself and the tab end surface corresponding to each inner hole 711 is measured. The flatness of the inner annular area of the tab end surface of the battery core 100 is obtained by comparing the distance data measured through the inner holes 711 to each other. Finally, the obtained flatness of the inner and outer annular areas are compared again to obtain accurate flatness data about the tab end surface of the battery core 100, so as to determine whether the battery core 100 is a qualified product.

It should be noted that the features in the embodiments of the present disclosure can be combined with each other without conflict.

The above are only the description of some preferable embodiments of the present disclosure, and is not intended to limit the present disclosure. It will be apparent to those of ordinary skill in the art that various modifications and variations can be made to the present disclosure. Any modifications, equivalent substitutions, improvements, etc. made within the gist and principle of the present disclosure shall fall within the scope of protection of the present disclosure.

What is claimed is:

1. A cylindrical cell flattening apparatus, comprising a base, a fixing device and a flattening device, wherein the base is configured to carry a battery core;

the fixing device comprises a driving mechanism and a fixing piece, wherein the fixing piece is mounted at an output end of the driving mechanism, and the driving mechanism is configured to drive the fixing piece to move toward the base to fix the battery core onto the base; and the flattening device comprises a pair of flattening mechanisms respectively arranged on two sides of the base, each flattening mechanism comprising a first driving member and a flattening seat, wherein the flattening seat is mounted on the first driving member, and the first driving member is configured to drive the flattening seat to press a tab of the battery core in order to form a flattened battery core;

wherein the flattening seat of each flattening mechanism is provided with a plurality of flattening grooves corresponding to the tab of the battery core, and internal structures of the plurality of flattening grooves are different from each other.

2. The cylindrical cell flattening apparatus of claim 1, further comprising a first detection device, wherein the first detection device comprises a pair of first detection mechanisms respectively arranged on two sides of the base; and wherein one of the first detection mechanisms comprises a second driving member, a first pressing piece and a distance measuring sensor, the first pressing piece is mounted on the second driving member, the second driving member is configured to drive the first pressing piece to push the battery core on the base to move, the distance measuring sensor is mounted on the first pressing piece, and the distance measuring sensor is configured to detect a position of the battery core on the base.

3. The cylindrical cell flattening apparatus of claim 1, further comprising a third detection device, wherein the third detection device comprises a pair of third detection mechanisms respectively arranged on two sides of the battery core on the base; and wherein one of the third detection mechanisms comprises a third driving member, a second pressing piece, and a contact sensor, the second pressing piece is mounted on the third driving member, the third driving member is configured to drive the second pressing piece into contact with an end of the battery core, the contact sensor is mounted on the second pressing piece, and the contact sensor is configured to measure a length of the flattened battery core.

4. The cylindrical cell flattening apparatus of claim 1, further comprising a fourth detection device, wherein the fourth detection device comprises a pair of fourth detection mechanisms respectively arranged on two sides of the battery core on the base, and wherein one of the fourth detection mechanisms comprises a fourth driving member, a positioning plate and a displacement sensor, the positioning plate is mounted on the fourth driving member, the fourth driving member is configured to drive the positioning plate into contact with the tab of the battery core, and the displacement sensor is configured to measure a flatness of an end surface of the flattened battery core.

5. The cylindrical cell flattening apparatus of claim 4, wherein the positioning plate is provided with a plurality of inner holes and a plurality of outer holes, the inner holes and the outer holes are circumferentially arrayed on the positioning plate, and a diameter of a circle formed by the plurality of inner holes is smaller than a diameter of a circle formed by the plurality of outer holes; the plurality of outer holes are arranged such that axial projections of the plurality of outer holes onto the end surface of the flattened battery core are outside of a tab surface of the flattened battery core, the displacement sensor is movably arranged on the fourth driving member, and the displacement sensor emits laser light passing through the plurality of outer holes for measuring a flatness of an outer annular area of an end surface of the tab of the flattened battery core; and the plurality of inner holes are arranged such that axial projections of the plurality of inner holes onto the end surface of the flattened battery core are within the tab surface of the flattened battery core, and the displacement sensor emits laser light passing through the plurality of inner holes for measuring a flatness of an inner annular area of the end surface of the tab of the flattened battery core.

* * * * *